Jan. 6, 1948.   J. G. BEVAN   2,433,884
SEWAGE TREATING APPARATUS COMPRISING A RECEPTACLE HAVING A
ROTATABLE SUPPORT PARTIALLY SUBMERGED IN LIQUID THEREIN
AND HAVING A MATRIX OF OXIDIZING BACTERIA THEREON
Filed Aug. 22, 1944
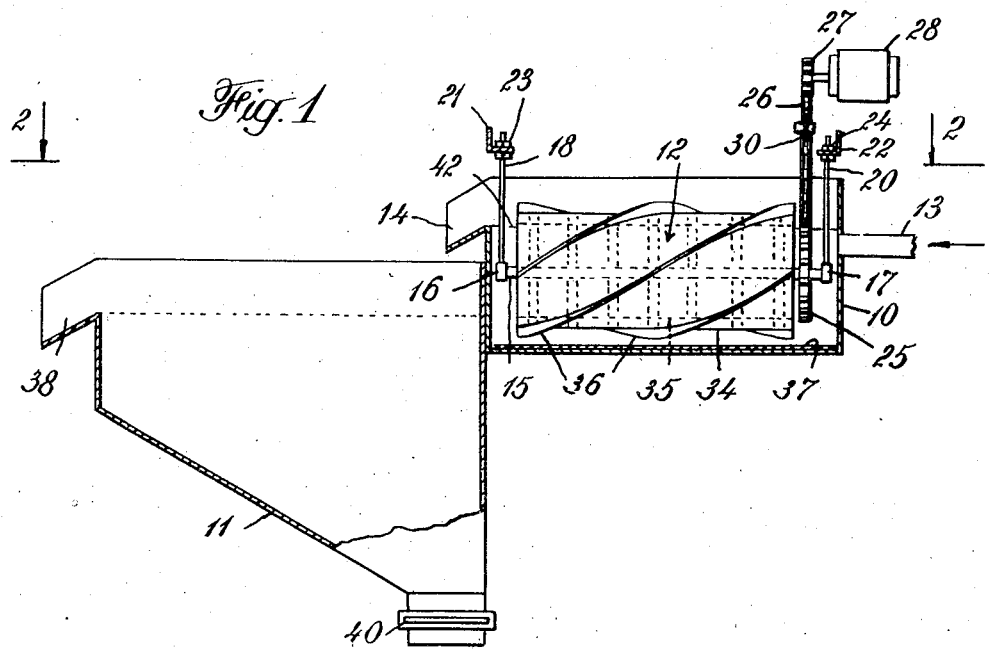
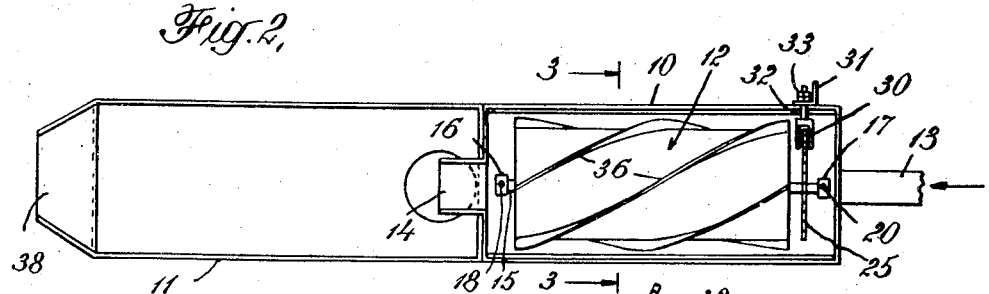
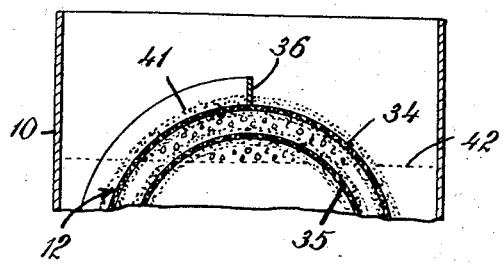
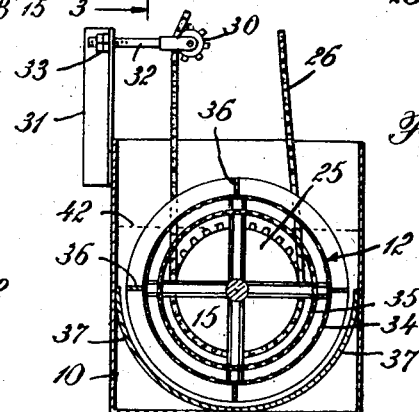
INVENTOR
John G. Bevan
BY
ATTORNEYS

UNITED STATES PATENT OFFICE 2,433,884

SEWAGE TREATING APPARATUS COMPRISING A RECEPTACLE HAVING A ROTATABLE SUPPORT PARTIALLY SUBMERGED IN LIQUID THEREIN AND HAVING A MATRIX OF OXIDIZING BACTERIA THEREON

John G. Bevan, New York, N. Y., assignor to Guggenheim Brothers, New York, N. Y., a copartnership Application August 22, 1944, Serial No. 550,554

12 Claims. (Cl. 210—8)

This invention relates to sewage treatment and has for an object the provision of improved apparatus for treating sewage and similar waste liquors. More particularly, the invention contemplates the provision of improved apparatus for use in the purification of sewage by means of biological methods or processes.

The apparatus of the present invention employs a naturally or spontaneously developed organic complex or matrix containing the oxidizing bacteria similar to that developed in the trickling filter process, and this matrix is aerated by being exposed intermittently to the air while the bacteria are fed by alternately exposing the matrix to the sewage. The matrix containing the oxidizing bacteria is formed on a movable support, and the support with the matrix thereon is alternately immersed in the liquid sewage to be purified and exposed to the atmosphere (air) above the sewage.

It is the essence of this invention that these alternate exposures to air and sewage are of short duration, measured in terms of minutes or seconds, as compared with processes such as the contact filter process in which the periods of exposure to air and to sewage are measured in hours.

The operation of the apparatus of the invention is furthermore distinguished from the activated sludge process by the provision of means for the passage of the flowing stream of sewage over or in contact with a matrix of bacteria fixed relatively to the flow of the sewage, whereby the latter are intermittently fed and aerated in cycles measured in minutes or seconds instead of being alternately fed and aerated in cycles measured in hours with consequent starvation for substantial periods.

Any suitable support may be employed and any suitable means may be employed for effecting immersion in the sewage and exposure to the atmosphere. Preferably, the support is provided with a rough surface to which the organic complex or matrix may adhere readily. A support comprising wire mesh having about one-quarter inch openings may be employed advantageously.

Operation with the apparatus of the invention may be initiated simply by alternately immersing and exposing the support. The time of exposure to the atmosphere should be sufficient to permit proper oxygen absorption, and the time of immersion should be sufficient to permit effective adsorption of putrescible matter but not so long as to result in destruction of the bacteria from lack of oxygen. The apparatus may be operated satisfactorily with exposure to the atmosphere for as short a period as about two (2) to five (5) seconds and immersion in the sewage for as short a period as about three (3) to seven (7) seconds. Any suitable relatively short periods of exposure and immersion may be employed. Alternate immersion and exposure at a controlled rate results in the development on the support of an organic complex or matrix in the form of a gelatinous layer, and the development of the matrix will reach equilibrium in about five to ten days.

The rate of speed at which the support is moved in the immersion and exposure operations should be controlled to permit the development and maintenance of a matrix of optimum qualities which may be lifted out from the sewage without substantial disruption and returned to the sewage substantially intact.

When the rate of speed at which the support is moved in the immersion and exposure operations and the times of immersion and exposure are maintained constant, the characteristics of the matrix will remain constant after equilibrium has been attained, but the composition of the matrix will tend to change constantly because the tendency to produce organic complex or matrix will not be arrested and because of the continuous resolution and destruction of bacteria and accumulation of material by the bacteria. Matrix containing dead, destroyed or ineffective bacterial will slough off constantly and be replaced by freshly formed matrix.

When the matrix is immersed in the sewage, the dissolved putrescible matter is adsorbed rapidly, providing the food for the growth and propagation of the bacteria and being consumed and eliminated in the immersion and exposure stages. Freshly formed organic complex or matrix which does not become attached to the support and matrix containing dead, destroyed or ineffective bacteria which sloughs off the support form flocs which become suspended in the sewage and entrain the insoluble matter (suspended solids) of the sewage to form a settleable sludge.

Treated sewage is removed from the vicinity of the support with the matrix thereon, and the sludge is separated from the accompanying liquor.

The time of treatment and the volume of sewage treated relatively to the area of matrix employed will be determined by the results sought. Sewage is retained in a suitable treatment vessel and repeatedly subjected to the action of the matrix containing the oxidizing bacteria for a period of time sufficient to permit accomplishment of the degree of purification sought to be achieved. In treating the effluent from a preliminary settler fed with raw sewage from a typical United States municipality, good results can be obtained by treating the effluent for a period of one hour at a rate of flow of two gallons for each square foot of matrix surface. Elimination of about seventy-five to ninety percent or more of the putrescible matter of ordinary municipal sewages can be accomplished readily by means of treatment periods varying from about one-half hour to one hour.

The preferred apparatus of the invention comprises a receptacle for the retention of sewage to be purified, means for introducing sewage to be purified into the receptacle, means for withdrawing treated sewage from the receptacle, a support movably mounted adjacent the receptacle in such position as to be capable of being immersed in sewage contained in the receptacle and exposed to the atmosphere above sewage in the receptacle, and means for alternately immersing the support in sewage to be purified and exposing the support to the atmosphere. The apparatus of the invention may include, also, a clarifier into which treated sewage may be conducted to permit the separation of sludge from the accompanying liquor. A complete plant may include the usual screens and a preliminary settler for removing coarse materials.

The movable support preferably is in the form of a cylinder or drum open at both ends mounted within the retention receptacle for rotation about its horizontal axis. The bottom portion of the retention receptacle preferably is curved to conform substantially to the curvature of the cylinder, and the sewage inlet and outlet preferably are disposed adjacent the opposite ends of the cylinder to permit the continuous flow of sewage longitudinally of the cylinder.

The cylinder is so mounted as to be only partially submerged or immersed when sewage is flowing through the retention receptacle, and the mounting preferably is adjustable to permit variation in the degree of submergence or immersion. Variation in the degree of submergence or immersion may be accomplished in any other suitable manner if desired, as, for example, by raising or lowering the level of the sewage through variation of the elevation of the outlet.

The cylinder preferably is provided with spirally arranged longitudinal ribs projecting from the outer surface which perform the three-fold function of (1) aiding in supporting the matrix, (2) aiding in maintaining sludge in suspension and producing flocculation and (3) mixing incoming sewage with partially treated sewage to provide a body of sewage of substantially uniform composition but of slightly decreasing concentration with respect to putrescible matter from the inlet end to the outlet end of the retention receptacle.

The cylinder may consist of only one wall or it may comprise two or more walls, each being the wall of a cylindrical element and the elements being co-axial and telescoped.

The wall or walls of the cylinder may be formed of any suitable material. In the preferred form of apparatus a foraminous material such as wire mesh is employed.

A variable speed drive preferably is provided to permit rotation of the cylinder at different speeds.

The invention will be better understood from a consideration of the following description in conjunction with the accompanying drawing in which Fig. 1 is an elevation, partly in section, illustrating a preferred embodiment of apparatus of the invention;

Fig. 2 is a sectional plan taken substantially along the line 2—2 of Fig. 1;

Fig. 3 is a fragmentary sectional elevation taken substantially along the line 3—3 of Fig. 2; and Fig. 4 is an enlarged horizontal section of the matrix support shown in Figs. 1 to 3.

The apparatus shown in Figs. 1 to 4 of the drawings comprises a retention receptacle 10, and a clarifier 11 so disposed as to receive treated sewage from the retention receptacle 10.

A cylindrical support 12 for organic complex or matrix is adjustably mounted for rotation about its horizontal axis within the retention receptacle 10 with its opposite ends disposed adjacent the sewage inlet 13 and the sewage outlet 14. A central shaft 15 forming the axis of the cylindrical support has its ends mounted in bearings 16 and 17 carried by depending bearing supports 18 and 20. The bearing supports 18 and 20 are rod-like elements having their upper end-portions threaded and extending through openings in rigid brackets 21 and 22 wherein they are locked by means of pairs of lock-nuts 23 and 24, one of each pair being above and one below their respective brackets. The cylindrical support 12 may be raised or lowered by adjustment of the nuts 23 and 24.

A sprocket 25 is rigidly mounted on the central shaft 15 of the cylindrical support and connected by means of a driving chain 26 with a driving sprocket 27 rigidly mounted on an end portion of the shaft of a variable speed motor 28 connected with a suitable source of power (not shown).

An idler sprocket 30 is adjustably mounted on a rigid bracket 31 in operating engagement with the sprocket chain 26. The idler sprocket is carried by a horizontally disposed support 32 having a threaded end-portion extending through an opening in the bracket 31 and maintained in position therein by means of lock-nuts 33. The position of the idler sprocket 30 may be adjusted by manipulation of the nuts 33 to maintain the driving chain 26 sufficiently taut, the driving chain 26 being sufficiently long to permit adjustment of the cylindrical support to its lowermost desirable operating position, and the idler sprocket 30 being adjustable to maintain the driving chain properly taut when the cylindrical support is in its uppermost desirable operating position. Provision may be made advantageously to permit from about one-quarter to one-third of the surface of the cylindrical support to extend above the level of the sewage in the retention receptacle 10.

As indicated, the cylindrical support comprises two cylindrical elements 34 and 35 rigidly mounted on the shaft 15 in axial alignment and in telescoping relationship. The cylindrical elements 34 and 35 are formed of wire mesh.

The cylindrical support is provided with rigidly mounted spirally arranged, horizontally extending ribs 36 projecting from its outer surface.

The lower portion of the retention receptacle 10 is curved as at 37 to conform to the curvature of the cylindrical support 12.

The clarifier 11 is provided with an overflow outlet 38 and a sludge discharge valve 40.

In the operation of the apparatus shown in Figs. 1 to 4, sewage, preferably the effluent from a preliminary settler (not shown), is introduced into the retention receptacle 10 through the inlet 13 at a controlled rate while the cylindrical support is being rotated at a controlled speed and in a direction such that the ribs 36 tend to move sewage contained in the retention receptacle toward the inlet end. An organic complex or matrix containing oxidizing bacteria commences to build up on the cylindrical elements 34 and 35 as indicated at 41 (Fig. 4) and, after several days, equilibrium is attained. Sewage flows continuously into the retention receptacle 10 where it is acted upon by the matrix 41, and treated sewage containing sludge in suspension flows continuously from the retention receptacle 10 through the outlet 14 to the clarifier 11. Sludge contained in the treated sewage settles in the clarifier 11 from where it may be withdrawn continuously or intermittently through the valve 40 and disposed of in any suitable manner. Purified sewage flows continuously from the clarifier 11 through the outlet 38 from where it may be conducted to any suitable point of disposal.

The matrix 41 is alternately submerged in sewage (below the sewage level indicated at 42 in the retention receptacle) and exposed to the atmosphere above the sewage.

As indicated in Fig. 4, water contained in the matrix drains therefrom in the form of small droplets when the matrix is exposed to the atmosphere. Draining of the water produces a suction effect which promotes contact of the atmosphere with the matrix. Also, the small droplets of liquid absorb oxygen from the atmosphere and promote the contact of oxygen with the matrix and the introduction of oxygen into the sewage.

I claim:

1. Apparatus for use in the purification of sewage comprising a receptacle for the retention of sewage to be purified, an inlet for introducing sewage to be purified into said receptacle to form a body of liquid sewage therein, an outlet for withdrawing treated sewage from said receptacle spaced from said inlet to provide for a horizontal flow of sewage through said receptacle, a support having a rough surface and capable of supporting a matrix of oxidizing bacteria rotatably mounted within said receptacle in such position as to be partially submerged in sewage contained therein with its axis of rotation extending in the direction of flow of sewage through the receptacle, a matrix consisting essentially of oxidizing bacteria disposed on said support, and means for rotating said support at such a rate as to provide for the establishment and maintenance thereon of the matrix of oxidizing bacteria and to alternately immerse in the sewage and expose to the atmosphere above the sewage the matrix of oxidizing bacteria to alternately provide food and oxygen to promote the growth and propagation of the bacteria and effect the removal of dissolved putrescible matter and the production of a settleable sludge containing suspended putrescible matter originally present in the sewage.

2. Apparatus for use in the purification of sewage comprising a receptacle for the retention of sewage to be purified, an inlet for introducing sewage to be purified into said receptacle to form a body of liquid sewage therein, an outlet for withdrawing treated sewage from said receptacle spaced from said inlet to provide for a horizontal flow of sewage through said receptacle, a support comprising foraminous material and capable of supporting a matrix of oxidizing bacteria rotatably mounted within said receptacle in such position as to be partially submerged in sewage contained therein, a matrix consisting essentially of oxidizing bacteria disposed on said support, and means for rotating said support at such a rate as to provide for the establishment and maintenance thereon of the matrix of oxidizing bacteria and to alternately immerse in the sewage and expose to the atmosphere above the sewage the matrix of oxidizing bacteria to alternately provide food and oxygen to promote the growth and propagation of the bacteria and effect the removal of dissolved putrescible matter and the production of a settleable sludge containing suspended putrescible matter originally present in the sewage.

3. Apparatus for use in the purification of sewage comprising a receptacle for the retention of sewage to be purified, an inlet for introducing sewage to be purified into said receptacle to form a body of liquid sewage therein, an outlet for withdrawing treated sewage from said receptacle spaced from said inlet to provide for a horizontal flow of sewage through said receptacle, a support comprising a plurality of spaced layers of foraminous material having a matrix consisting essentially of oxidizing bacteria thereon movably mounted adjacent said receptacle in such position as to be capable of being immersed in sewage contained in said receptacle and exposed to the atmosphere above sewage contained in said receptacle, and means for alternately immersing in sewage contained in said receptacle and exposing to the atmosphere said support with the matrix of oxidizing bacteria thereon.

4. Apparatus for use in the purification of sewage comprising a receptacle for the retention of sewage to be purified, an inlet for introducing sewage to be purified into said receptacle to form a body of liquid sewage therein, an outlet for withdrawing treated sewage from said receptacle spaced from said inlet to provide for a horizontal flow of sewage through said receptacle, a support comprising a plurality of spaced layers of foraminous material and capable of supporting a matrix of oxidizing bacteria rotatably mounted within said receptacle in such position as to be partially submerged in sewage contained therein, a matrix consisting essentially of oxidizing bacteria disposed on said support, and means for rotating said support at such a rate as to provide for the establishment and maintenance thereon of the matrix of oxidizing bacteria and to alternately immerse in the sewage and expose to the atmosphere above the sewage the matrix of oxidizing bacteria to alternately provide food and oxygen to promote the growth and propagation of the bacteria and effect the removal of dissolved putrescible matter and the production of a settleable sludge containing suspended putrescible matter originally present in the sewage.

5. Apparatus for use in the purification of sewage comprising a receptacle for the retention of sewage to be purified, an inlet for introducing sewage to be purified into said receptacle to form a body of liquid sewage therein, an outlet for withdrawing treated sewage from said receptacle spaced from said inlet to provide for a horizontal flow of sewage through said receptacle, a cylindrical support comprising a plurality of spaced layers of foraminous material and capable of supporting a matrix of oxidizing bacteria rotatably mounted within said receptacle in such position as to be partially submerged in sewage contained therein, a matrix consisting essentially of oxidizing bacteria disposed on said support, and means for rotating said support at such a rate as to provide for the establishment and maintenance thereon of the matrix of oxidizing bacteria and to alternately immerse in the sewage and expose to the atmosphere above the sewage the matrix of oxidizing bacteria to alternately provide food and oxygen to promote the growth and propagation of the bacteria and effect the removal of dissolved putrescible matter and the production of a settleable sludge containing suspended putrescible matter originally present in the sewage.

6. Apparatus for use in the purification of sewage comprising a receptacle for the retention of sewage to be purified, an inlet for introducing sewage to be purified into said receptacle to form a body of liquid sewage therein, an outlet for withdrawing treated sewage from said receptacle spaced from said inlet to provide for a horizontal flow of sewage through said receptacle, a support capable of supporting a matrix of oxidizing bacteria rotatably and adjustably mounted within said receptacle in such position as to be partially controllably submerged in sewage contained therein, a matrix consisting essentially of oxidizing bacteria disposed on said support and means for rotating said support at such a rate as to provide for the establishment and maintenance thereon of the matrix of oxidizing bacteria and to alternately immerse in the sewage and expose to the atmosphere above the sewage the matrix of oxidizing bacteria to alternately provide food and oxygen to promote the growth and propagation of the bacteria and effect the removal of dissolved putrescible matter and the production of a settleable sludge containing suspended putrescible matter originally present in the sewage.

7. Apparatus for use in the purification of sewage comprising a receptacle for the retention of sewage to be purified, an inlet for introducing sewage to be purified into said receptacle to form a body of liquid sewage therein, an outlet for withdrawing treated sewage from said receptacle spaced from said inlet to provide for a horizontal flow of sewage through said receptacle, a support comprising foraminous material and capable of supporting a matrix of oxidizing bacteria rotatably and adjustably mounted within said receptacle in such position as to be partially controllably submerged in sewage contained therein, a matrix consisting essentially of oxidizing bacteria disposed on said support, and means for rotating said support at such a rate as to provide for the establishment and maintenance thereon of the matrix of oxidizing bacteria and to alternately immerse in the sewage and expose to the atmosphere above the sewage the matrix of oxidizing bacteria to alternately provide food and oxygen to promote the growth and propagation of the bacteria and effect the removal of dissolved putrescible matter and the production of a settleable sludge containing suspended putrescible matter originally present in the sewage.

8. Apparatus for use in the purification of sewage comprising a receptacle for the retention of sewage to be purified, an inlet for introducing sewage to be purified into said receptacle to form a body of liquid sewage therein, an outlet for withdrawing treated sewage from said receptacle spaced from said inlet to provide for a horizontal flow of sewage through said receptacle, a support comprising a plurality of spaced layers of foraminous material and capable of supporting a matrix of oxidizing bacteria rotatably and adjustably mounted within said receptacle in such position as to be partially controllably submerged in sewage contained therein, a matrix consisting essentially of oxidizing bacteria disposed in said support, and means for rotating said support at such a rate as to provide for the establishment and maintenance thereon of the matrix of oxidizing bacteria and to alternately immerse in the sewage and expose to the atmosphere above the sewage the matrix of oxidizing bacteria to alternately provide food and oxygen to promote the growth and propagation of the bacteria and effect the removal of dissolved putrescible matter and the production of settleable sludge containing suspended putrescible matter originally present in the sewage.

9. Apparatus for use in the purification of sewage comprising a receptacle for the retention of sewage to be purified, an inlet for introducing sewage to be purified into said receptacle, an outlet for withdrawing treated sewage from said receptacle spaced from said inlet to provide for a horizontal flow of sewage through said receptacle, a support comprising foraminous material and capable of supporting a matrix of oxidizing bacterial rotatably mounted within said receptacle in such position as to be partially submerged in sewage contained therein with its axis of rotation substantially parallel to the direction of flow of sewage through the receptacle, and means for rotating said support at such a rate as to provide for the establishment and maintenance thereon of a matrix of oxidizing bacteria and to alternately immerse in the sewage and expose to the atmosphere above the sewage the matrix of oxidizing bacteria to alternately provide food and oxygen to promote the growth and propagation of the bacteria and effect the removal of dissolved putrescible matter and the production of a settleable sludge containing suspended putrescible matter originally present in the sewage.

10. Apparatus for use in the purification of sewage comprising a receptacle for the retention of sewage to be purified, an inlet for introducing sewage to be purified into said receptacle, an outlet for withdrawing treated sewage from said receptacle spaced from said inlet to provide for a horizontal flow of sewage through said receptacle, a support comprising foraminous material and capable of supporting a matrix of oxidizing bacteria rotatably mounted within said receptacle in such position as to be partially submerged in sewage contained therein, spirally arranged ribs mounted on the outer surface of the rotatable support, and means for rotating said support at such a rate as to provide for the establishment and maintenance thereon of a matrix of oxidizing bacteria and to alternately immerse in the sewage and expose to the atmosphere above the sewage the matrix of oxidizing bacteria to alternately provide food and oxygen to promote the growth and propagation of the bacteria and effect the removal of dissolved putrescible matter and the production of a settleable sludge containing suspended putrescible matter originally present in the sewage.

11. Apparatus for use in the purification of sewage comprising a receptacle for the retention of sewage to be purified, an inlet for introducing sewage to be purified into said receptacle, an outlet for withdrawing treated sewage from said receptacle spaced from said inlet to provide for a horizontal flow of sewage through said receptacle, a cylindrical support comprising foraminous material and capable of supporting a matrix of oxidizing bacteria rotatably mounted within said receptacle in such position as to be partially submerged in sewage contained therein, a matrix consisting essentially of oxidizing bacteria disposed on said support, and means for rotating said support at such a rate as to provide for the establishment and maintenance thereon of the matrix of oxidizing bacteria and to alternately immerse in the sewage and expose to the atmosphere above the sewage the matrix of oxidizing bacteria to alternately provide food and oxygen to promote the growth and propagation of the bacteria and effect the removal of dissolved putrescible matter and the production of a settleable sludge containing suspended putrescible matter originally present in the sewage.

12. Apparatus for use in the purification of sewage comprising a receptacle for the retention of sewage to be purified, an inlet for introducing sewage to be purified into said receptacle, an outlet for withdrawing treated sewage from said receptacle spaced from said inlet to provide for a horizontal flow of sewage through said receptacle, a cylindrical support comprising foraminous material and capable of supporting a matrix of oxidizing bacteria rotatably mounted within said receptacle in such position as to be partially submerged in sewage contained therein, spirally arranged ribs mounted on the outer surface of the cylindrical support and extending longitudinally thereof, and means for rotating said support at such a rate as to provide for the establishment and maintenance thereon of a matrix of oxidizing bacteria and to alternately immerse in the sewage and expose to the atmosphere above the sewage the matrix of oxidizing bacteria to alternately provide food and oxygen to promote the growth and propagation of the bacteria and effect the removal of dissolved putrescible matter and the production of a settleable sludge containing suspended putrescible matter originally present in the sewage.

JOHN G. BEVAN.

REFERENCES CITED

The following references are of record in the file of this patent:

UNITED STATES PATENTS

| Number | Name | Date |
| --- | --- | --- |
| 249,719 | Woodhouse | Nov. 15, 1881 |
| 368,071 | Coes | Aug. 9, 1887 |
| 616,033 | Sturcke | Dec. 13, 1898 |
| 679,195 | Toplis | July 23, 1901 |
| 798,908 | Kremer | Sept. 5, 1905 |
| 1,253,401 | Lorimer | Jan. 15, 1918 |
| 1,343,797 | Stott et al. | June 15, 1920 |
| 1,449,622 | Peck | Mar. 27, 1923 |
| 1,666,164 | Chappell | Apr. 17, 1928 |
| 1,811,181 | Maltby | June 23, 1931 |
| 2,008,507 | Laughlin | July 16, 1935 |

FOREIGN PATENTS

| Number | Country | Date |
| --- | --- | --- |
| 50,963 | Switzerland | Mar. 22, 1910 |
| 53,179 | Switzerland | Sept. 15, 1910 |
| 193,633 | Switzerland | Jan. 17, 1938 |
| 247,769 | Great Britain | Feb. 25, 1926 |
| 508,881 | Great Britain | July 7, 1939 |
| 784,706 | France | May 6, 1935 |